Oct. 8, 1935. A. P. THURSTON 2,016,582
MEANS FOR REDUCING THE RESISTANCE OF AIR COOLED
MOTORS AND LIKE OBSTRUCTIONS ON AIRCRAFT
Filed Dec. 13, 1934 2 Sheets-Sheet 2

Albert Peter Thurston
INVENTOR
his ATTY.

Patented Oct. 8, 1935

2,016,582

UNITED STATES PATENT OFFICE 2,016,582

MEANS FOR REDUCING THE RESISTANCE OF AIR COOLED MOTORS AND LIKE OBSTRUCTIONS ON AIRCRAFT

Albert Peter Thurston, London, England

Application December 13, 1934, Serial No. 757,262
In Great Britain November 27, 1933

10 Claims. (Cl. 244—31)

This invention relates to means for reducing the resistance of air cooled motors and like obstructions on aircraft. The invention may also be used to increase the cooling action of the air on the motor.

The airflow on the upper surface of a long thin body, such as an aeroplane wing, moving in a current of air may be controlled, or kept from becoming turbulent, by a rider plane rotating in a plane above the wing on an axis transverse to the surface of the said wing as described in my prior British Patents Nos. 331,283 and 377,178. The airflow over such a system, if "end effect" is neglected, is approximately "two dimensional". A downward motion is given to the air flowing over the top side of the aeroplane wing by the cross sectional shape of the rider plane and also by motion in its "plane of rotation".

The airflow over the nose of a bulky body, such as that of an aeroplane diverges radially in every direction from its axis. This flow is "three dimensional".

The main idea of this invention is to cause a rider of suitable shape, such as a section of a ring of aerofoil cross section to sweep out a "surface or ring of rotation" about the axis of divergence in order to impose an inward radial motion on the air in opposition to the radial diverging motion, with a view to preventing turbulence or decreasing head resistance. The said inward radial motion is formed of components given by both the cross sectional shape and the rotational speed of the said rider.

Now when a rider plane is associated with an aeroplane wing it may be made to autorotate about a vertical axis by giving the blades a "pitch" in their "plane of rotation".

A secondary idea of this invention is to cause an arcuate rider associated with the nose of an aeroplane body to autorotate by giving the blades a pitch in their "surface of revolution".

It will be understood that the position and shape of the rider is chosen so that a maximum forward component is obtained from the air deflected by the rider in order to reduce the head resistance of the aeroplane as much as possible.

According to this invention the head resistance of air cooled motors and like obstructions on aircraft is reduced by moving laterally about the motor in a "surface or ring of revolution" a rider which is of aerofoil shape in cross section in a plane passing through the axis of the motor and is preferably of arcuate shape in end view.

An aeroplane body or the like provided with an air cooled motor in the nose may have one or more riders which are of suitable aerofoil section in a plane through the axis of the motor and which are mounted so as to sweep out a circular ring or cowl about the motor.

The rider or riders may consist of segments of circular rings which are aerofoil shape in cross section.

The rider or riders may be given a pitch relatively to the "surface or ring of revolution" by offsetting from the circular path the whole, or a part of the surface of the said rider or riders.

This pitch may be obtained by cambering inwardly the front portion of one side of each rider. Such riders will autorotate if free to move in one direction and require power to drive them in the opposite direction.

The riders may be associated with an aeroplane body or the like so as to work at a considerable lift coefficient and forward axial component.

One way of carrying the invention into effect is described with reference to the accompanying drawings, wherein:—

Figures 3, 4 and 5 show respectively sections on the lines 3—3, 4—4, 5—5 passing through the axis of the motor.

Figure 1:
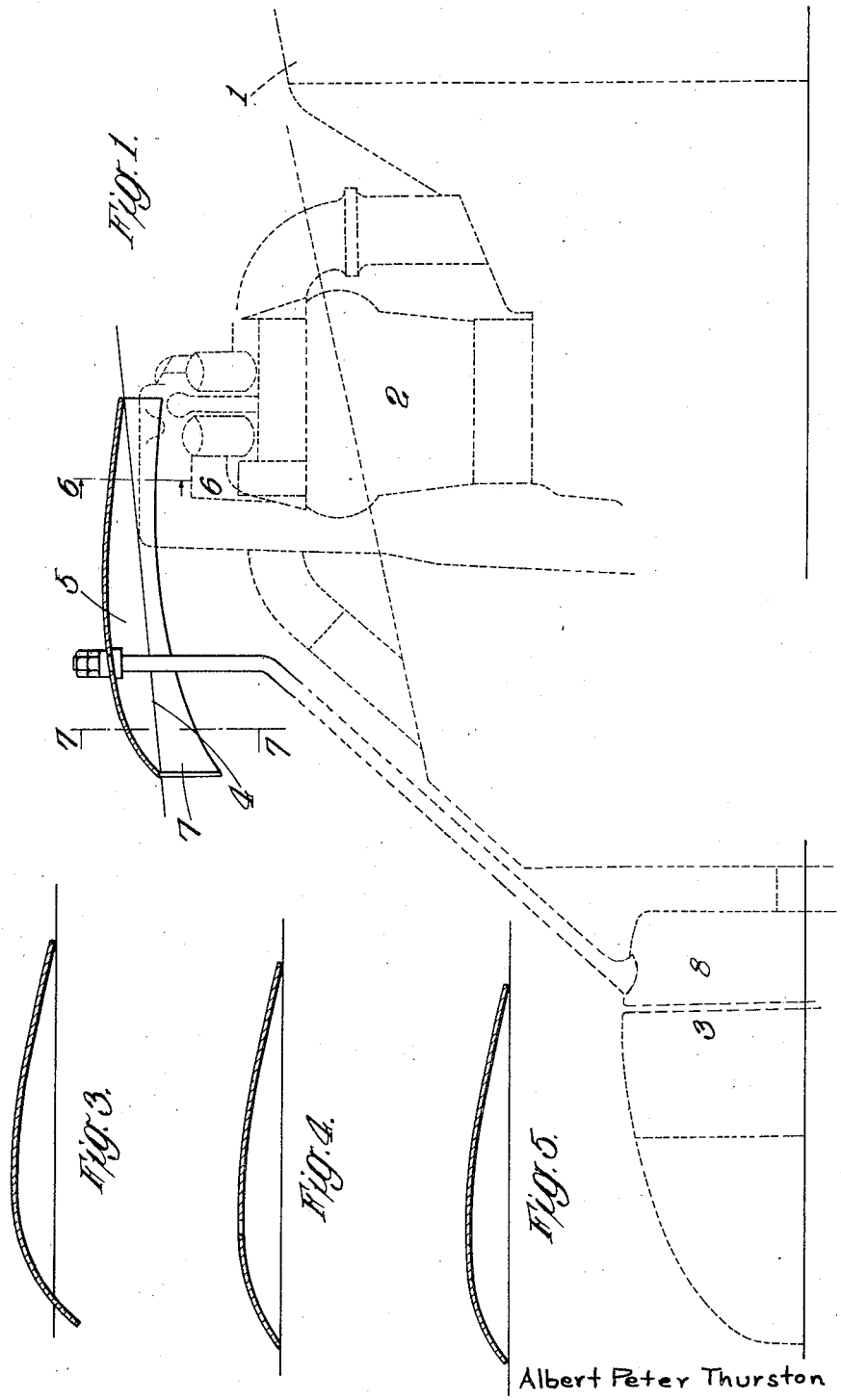
Figure 1 is a side view of an autorotating cowl or ring.

The body 1 of an aeroplane having an air cooled radial motor 2 fitted in the nose thereof and driving a tractor screw 3 is provided with a rotor 4 having two or more riders 5 which are mounted on radial arms 6 mounted on a central hub 8 freely rotatable on the propeller shaft so as to sweep out a ring or cowl shaped path concentric with the axis of the motor. The riders 5 consist of segments of circular rings which are of aerofoil section on lines passing through the axis of rotation. This aerofoil section is of a shape, found by experience, giving a considerable lift coefficient with a forward axial component, as in the well-known Townend ring.

Figure 2:
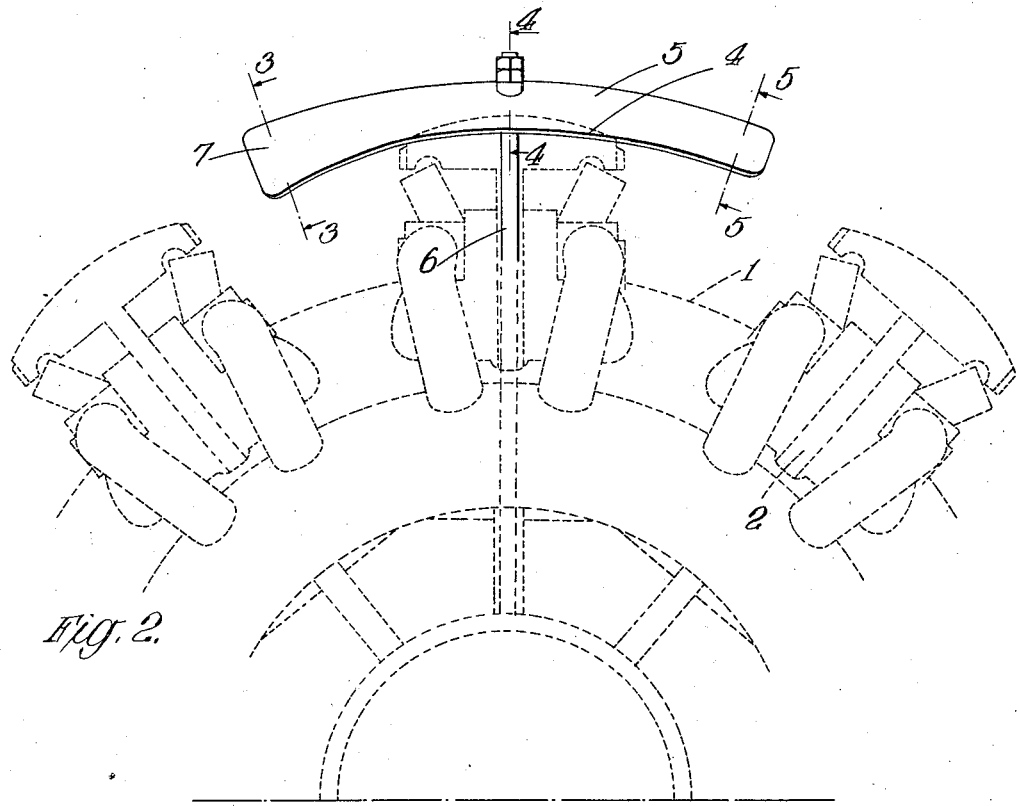
Figure 2 is a front view of Figure 1.
Figure 6:
Figures 6 and 7 show respectively sections at right angles to the axis of the motor on the lines 6—6, 7—7.
Figure 7:
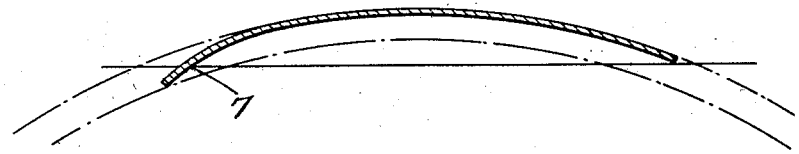

The rotor is given a pitch relatively to the "surface of revolution" by offsetting from the circular path a portion 7 of one front corner of each rider as shown in Figures 1, 2 and 7.

In flight the riders 5 autorotate at a speed dependent upon their shape and the extent of the said pitch.

Since it takes time for turbulence to start the speed of rotation should be so arranged that the riders re-pass any given spot before turbulence begins to reform. The riders may be connected to, or supported by, the air-screw so as to be positively driven and in this case they may be given a suitable pitch either to direct more air upon the motor for cooling purposes or to give a greater forward component. In other words, so as to force back the divergent air stream upon the body and motor that the reaction thereof gives a forward component to the riders.

In certain cases where the rotors are power driven the riders may be given a pitch in an axial direction preferably by arranging that the downturned leading edge is set at a pitch to the plane of rotation.

It will be understood that the invention is not limited to bodies having air cooled motors but can be used in all cases where the air moves in a divergent path in all directions from a single axis. Moreover, any number of riders may be used either adapted to travel in the same path or in concentric paths so as to sweep out in effect "biplane" or "triplane" circles. Further the riders may be connected together by rings of metal so that in effect a louvered cowl is obtained which if driven will force additional air onto the motor to increase the cooling effect, and in fact act as a "blower" to drive the air to any desired direction.

Alternatively the said cowl may be provided with louvres to cause it to autorotate and with other louvres to give an inward "blower" effect.

I claim:—

1. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor, a mounting for said rider plane allowing it to rotate and trace out an annular path about the said axis, and means for imparting a rotative force to said plane.

2. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor and cambered sections in planes at right angles thereto, a mounting for said rider plane allowing it to rotate and trace out an annular path about the said axis, and means for imparting a rotative force to said plane.

3. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor and forwardly inclined in such planes with respect to the radial airflow over the front of the motor so as to receive a forward thrust therefrom, a mounting for said rider plane allowing it to rotate and trace out an annular path about the said axis, and means for imparting a rotative force to said plane.

4. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor, a mounting for said rider plane allowing it to rotate and trace out an annular path about the said axis, and means for imparting a rotative force to said plane comprising at least a part of said plane laterally inclined with respect to the radial air flow over the front of the motor so as to receive a lateral thrust therefrom.

5. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor, a mounting for said rider plane allowing it to rotate and trace out an annular path about the said axis, and means for imparting a rotative force to said plane comprising an inwardly-cambered corner on the plane which receives a lateral thrust from the radial air flow over the front of the motor.

6. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor and cambered sections in planes at right angles thereto, a mounting for said rider plane allowing it to rotate and trace out an annular path about the said axis, and means for imparting a rotative force to said plane comprising an inwardly-cambered corner on the plane which receives a lateral thrust from the radial air flow over the front of the motor.

7. Means for reducing the head resistance of air cooled motors and like bodies on aircraft, said means comprising in combination a rider plane positioned adjacent to the forward edge of the motor for preventing turbulence thereat, having aerofoil sections in radial planes containing the longitudinal axis of the motor, a mounting for said rider plane allowing it to rotate and trace out an annular path about the said axis, and means for imparting a rotative force to said plane comprising a driving connection with the motor.

8. Means for reducing the head resistance of air cooled motors and like bodies on aircraft, said means comprising in combination a plurality of rider planes each positioned adjacent to the forward edge of the motor for preventing turbulence thereat, having aerofoil sections in planes containing the longitudinal axis of the motor, a mounting holding said rider planes in mutually spaced relationship and rotatable to allow them to trace out in combination at least one annular path about the said axis, and means for imparting a rotative force to the planes and mounting.

9. Means for reducing the head resistance of air cooled motors and like bodies on aircraft, said means comprising in combination a plurality of rider planes each positioned adjacent to the forward edge of the motor for preventing turbulence thereat, having aerofoil sections in planes containing the longitudinal axis of the motor, a mounting holding said rider planes in mutually spaced relationship and rotatable to allow them to trace out in combination at least one annular path about the said axis, and means for imparting a rotative force to the planes and mounting comprising an inwardly-cambered corner on at least some of the planes which receives a lateral thrust from the radial air flow over the front of the motor.

10. Means for reducing the head resistance of air cooled motors and like bodies on aircraft, said means comprising in combination a plurality of rider planes each positioned adjacent to the forward edge of the motor for preventing turbulence thereat, having aerofoil sections in planes containing the longitudinal axis of the motor and at least some of said planes being at least in part laterally inclined with respect to the radial air flow over the front of the motor so as on being positively rotated about said axis, to modify said flow, a mounting holding said rider planes in mutually spaced relationship and rotatable to allow them to trace out in combination at least one annular path about the said axis, and means for imparting a rotative force to the planes and mounting, comprising a driving connection to said motor.

ALBERT PETER THURSTON.